Dec. 27, 1938.   H. G. PETERSON   2,141,798
DISTILLATE TREATING PROCESS
Filed May 27, 1936
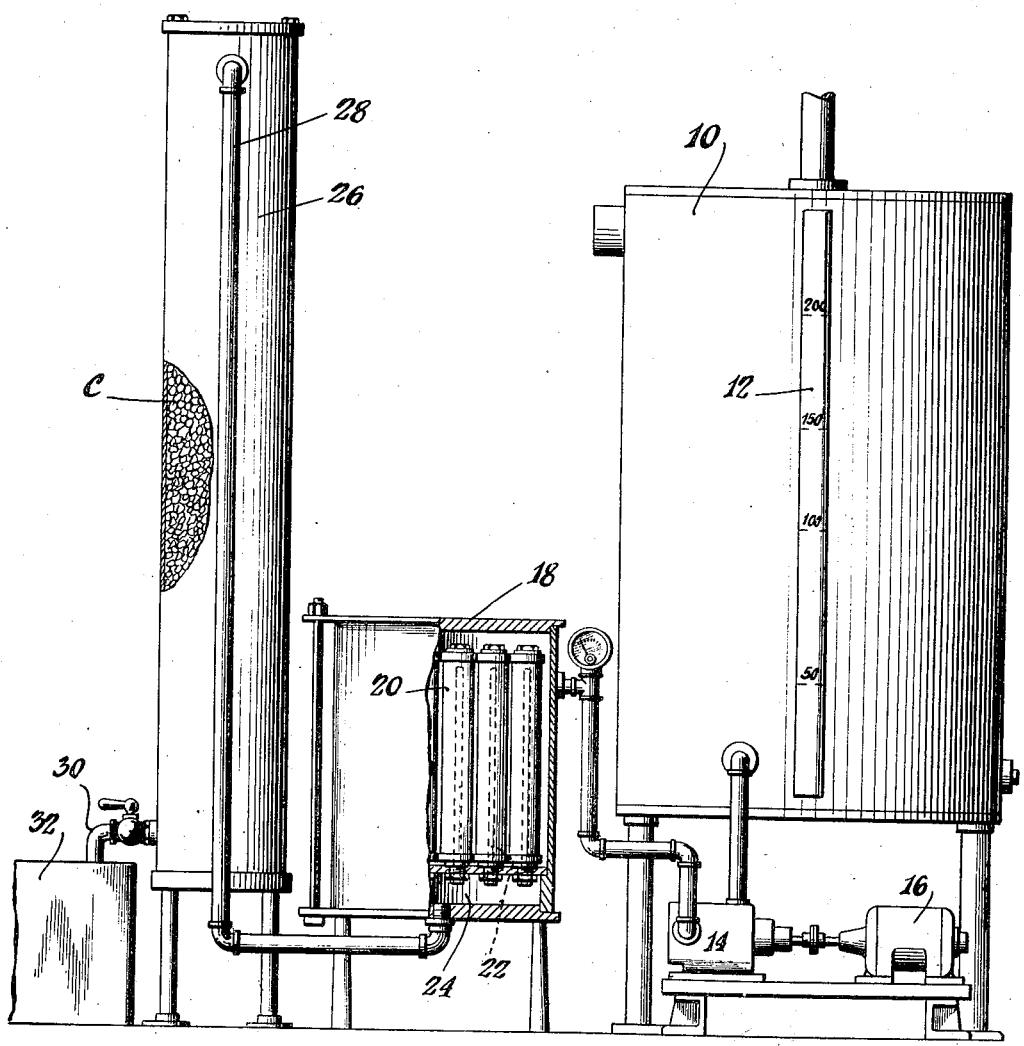
INVENTOR
HOWARD G. PETERSON
BY
Hoguet, Neary & Campbell
ATTORNEYS Patented Dec. 27, 1938

2,141,798

UNITED STATES PATENT OFFICE 2,141,798

DISTILLATE TREATING PROCESS

Howard G. Peterson, New York, N. Y.

Application May 27, 1936, Serial No. 82,029

9 Claims. (Cl. 210—62)

The present invention relates to the recovery of alcohol from alcohol distillates such as waste products commonly resulting from the distillation of alcohol or alcoholic beverages.

In the commercial distillation of alcoholic beverages and alcohol, the first portion to be distilled over generally consists of a 90 to 115 proof alcohol-containing solution characterized by the presence of "off" flavors and a disagreeable odor. The liquid portion remaining in the still after the desired spirits have been distilled off has undesirable characteristics similar to the first distilled portion and also contains as impurities the less volatile components. The first distilled portion distilled overhead or heads fraction and the portion remaining in the still or tails fraction incident to such distillation operations are generally of no commercial value, and are commonly thrown away. This is because no process has heretofore been devised which commercially could successfully separate the "off" flavors and odors from the alcohol solution.

A product of somewhat improved purity can be obtained by redistillation of these heads and tails fractions provided rather wide cuts or fractions containing the major portion of the undesirable components are separated. The resulting loss from such separation as well as the complex equipment and operations involved make the attempted separation unprofitable. Attempts also have been made to treat these waste fractions with activated carbon but the procedures followed have been unsuccessful in that a desirable product could not be produced from the waste product.

It is known, of course, that activated carbon has been used to treat alcoholic beverages for the purpose of ageing them. Also, it is known that various types of liquids containing colored impurities may be decolorized through the use of activated carbon. The carbons which are commonly used in the foregoing process are of the decolorizing type.

Commercial activated carbons which are generally employed as adsorbents may be grouped on the basis of their physical structure, properties, and applications, into four classes, namely, decolorizing, gas adsorbent, metal adsorbent and medicinal carbons. These carbons are not universally applicable nor effective for all purposes. The gas adsorbent carbons are granular, mechanically strong, relatively dense and highly active and finely porous, while decolorizing carbons are generally soft, finely pulverized and coarsely porous. The decolorizing carbons are ineffective as gas adsorbents, and the gas adsorbent types of carbons are not used for most decolorizing purposes.

My invention includes the process generally of segregating the heads and tails fractions of the alcohol distillation process, filtering this segregated portion through a first filter, preferably a diatomaceous earth or porcelain filter, suitable to remove colloidal and other contaminating components. The pre-treated fraction is then percolated through a layer of activated carbon, preferably of the gas-adsorbent type. The details of my process are subsequently discussed. The gas-adsorbent carbons have proven eminently satisfactory for removing odors and disagreeable tastes from waste alcohol fractions, and for the purposes of defining this invention the term "gas-adsorbent" indicates an activated carbon having a great density and weighing between 20 and 35 pounds per cubic foot, of very fine porosity, and of relatively great mechanical strength.

In practicing the present invention, it has been found that the most desirable results have been obtained by carrying out the second stage of the treatment of the heads and tails fractions at temperatures preferably between room temperature and 32° F.

I have also found that the so-called acid gas-adsorbent activated carbons are generally to be preferred in my process as more efficient in operation than the alkaline gas-adsorbent activated carbons. The affinity of the acid gas-adsorbent carbons for the impurities in the waste liquors may be explained possibly by the fact that these impurities carry negative ions and are attracted, more readily, to the acid activated carbon.

For a better understanding of the manner in which applicant's process is carried out, reference may be had to the accompanying drawing, disclosing an apparatus suitable for carrying out the process.

Illustrative of an apparatus suitable for use in carrying out my process, the drawing discloses a storage tank 10, equipped with a gauge 12, in which may be stored waste impure alcoholic spirit recovered from a distillation operation. The waste spirit is withdrawn from the storage tank 10, and forced by pump 14, driven by motor 16, through a first stage filter 18. This pre-treating filter 18 preferably utilizes diatomaceous earth or porous porcelain as a filtering medium. The filtering medium may conveniently be arranged in the form of a plurality of cylinders 20 having an internal bore 22. These cylinders 20, called candles, are finely and uniformly porous. The spirit is forced by the pump through the walls of the candles and the resulting filtrate passes to a sump 24 in the bottom of the filter 18.

Filters of the type illustrated are available commercially and are characterized by the ability to remove particles of colloidal dimensions from liquids.

The spirit passes from the filter 18 through the line 28 to the second stage of the process, namely the treating or percolating chamber 26. This chamber is filled to a preferred depth of between 36 and 48 inches with preferably a so-called acid gas-adsorbent type of activated carbon and may contain two or more cubic feet of carbon. The filtrate flows slowly down through the carbon to the outlet conduit 30 and thence to a storage tank 32.

The spirit preferably should percolate from top to bottom in chamber 26 so as to avoid displacing or stirring up the carbon. I have found that my continuous percolating treatment has many advantages, for example—in capacity and type of product when compared with an operation in which all of the liquid is treated simultaneously with the carbon with or without agitation. When a given amount of a liquid, containing impurities, is brought into contact with an activated carbon, the attraction of the carbon for the impurities is greater than the attraction of the liquid for the impurities. The carbon therefore adsorbs impurities, such as odor, flavor and coloring matter, until an equilibrium condition is reached, after which the carbon will remove no more impurities from that body of liquid. If, however, the carbon and such a liquid body are separated, and a new quantity of carbon then introduced into the same body of liquid, more impurities will be taken up by the carbon from the liquid until a second equilibrium condition is reached. In this second adsorption a smaller amount of impurities will remain in the liquid than after the first operation. If a third adsorption is carried out using another new quantity of carbon, a still smaller amount of impurities will remain in the liquid.

In my continuous flow operation, the preceding equilibrium phenomenon is utilized to secure a substantially complete separation of the impurities from the alcohol. As the impure solution passes through the percolating chamber, the concentration of impurities in the solution decreases from top to bottom, and the adsorbing activity of the carbon decreases from bottom to top. A condition is produced in the chamber, whereby the concentration of the impurities in the solution will vary substantially inversely to the activity of the carbon throughout the layer of carbon. The high adsorption activity of the carbon at the bottom of the layer will tend to remove any final small traces of impurities in the liquor until equilibrium conditions are reached.

In certain cases it may be found desirable to use an additional carbon treatment prior to the percolating operation. Such treatment may be carried out by thoroughly contacting a finely divided activated carbon with a batch of the spirit just prior to the treatment in the percolating chamber 26 and preferably subsequent to treatment in filter 18. After such batch treatment the finely divided particles of carbon are removed by filtration. Because of the tremendous surface area presented by the finely divided carbon, only a short period of contact is necessary. It has been found that this preliminary treatment, although ineffective to give the finally desired purified alcohol in view of the equilibrium condition arrived at as discussed above, does remove a portion of undesirable components and, to this extent, the maximum activity of the carbon in the percolating chamber 26 is maintained.

By way of a specific application, the improved process may be used in the recovery of alcohol from waste liquors in gin manufacture.

In the production of gin, alcohol is first distilled from a mash and the alcoholic distillate is again distilled in the presence of juniper and coriander berries. Generally in practice, the first fraction of the resulting distillate to pass overhead is discarded as waste material. This waste liquor is characterized by an extremely strong odor of juniper and coriander and unpalatable oils and also carries finely divided or colloidal organic material. The fraction is of no commercial value except possibly for an anti-freeze.

In my process the heads fraction is diverted to and segregated in tank 10. After the undesirable first portion of the distillate has been segregated, the desirable gin spirits are distilled until the alcoholic content of the condensing spirits drops below 115 proof. The distillation operation is terminated and the portion remaining in the still or tails fraction is removed either by distillation or by draining the still. This fraction is mixed with the segregated heads fraction in tank 10. The tails fraction is of considerably greater volume than the heads fraction and is characterized by the same undesirable odor and taste as that of the heads fraction.

The mixed heads and tails fractions, or impure spirits, will run as high as 15% by volume of the total original batch in the still and have an alcohol concentration of 50% or more. The impure spirits are cooled to room temperature or lower and forced through the filter under pressure of about 40 lbs. per square inch, the pressure being increased as the impurities are removed and accumulated on the filter. The filtrate produced is a clear liquid containing all of its original alcohol content and also the malodorous substances.

The filtrate then is passed through the percolating chamber 26 at the rate of about one gallon per square foot of surface area of activated carbon per minute, the carbon layer being between 36 and 48 inches thick. The odors and flavors and a portion of the alcohol are adsorbed on the carbon, so that the first portion of the alcohol solution issuing from the percolating chamber shows a slight decrease in alcohol concentration. The alcohol-water solution is free from juniper and coriander flavor and odor and is of such purity that it may be mixed with further batches of alcohol in the gin still, or may be mixed directly with the distilled gin, or may be utilized in any manner in which pure alcohol free from taste, odor and color would be used.

My process may be utilized in a like manner for the treatment of other distilled beverages, such as brandies, whiskeys, "high" wines, etc., and in addition may be used for the treatment of waste fractions resulting from the production of grain alcohol. These waste fractions contain disagreeable and injurious oils and have disagreeable odors and flavors. Formerly this material was used only as a low grade "anti-freeze" alcohol, the disagreeable odor rendering it useless for any other purpose. By the present process, these low grade alcohols may be treated, and the "off" flavors and odors removed.

If desired, the alcohol-water mixtures produced by my deodorizing and deflavoring process may be redistilled to reduce the water content, thus producing a high-proof alcohol. Closely controlled fractional distillation of the treated grain alcohol waste products will remove the objectionable and injurious oils and will produce a substantially pure grade of grain alcohol.

An advantage of my invention is that the carbon in the percolating chamber 26 when it finally reaches a condition such that it is no longer an effective treating agent, may be readily treated or reactivated by the use of superheated steam and brought back to a degree of effectiveness very closely approaching its original state. In my process, by the use of the pretreating filter, I minimize the adsorption by the carbon of any components which cannot be easily volatilized and removed by blowing with superheated steam. Thus I obtain the maximum effectiveness and activity of the activated carbon.

The finely porous filter 18 may be at times clogged by accumulations of solid material when the impure spirit contains an excessive amount of such impurities. Clogging of the filter reduces the flow of spirit therethrough and places a great strain on the pump 14.

To overcome the clogging of the filter it may be found desirable to use a roughing filter prior to the pretreating filter 18. Such a roughing filter may utilize a paper or asbestos filtering medium, to remove the greater portion of the solid material.

Alternatively, part of the impurities may be removed by settling and decanting, as by the use of a coagulating medium such as aluminum sulphate. In using such a coagulating medium, the pH must be maintained between 6.3 and 7.0 in order to avoid excessive precipitation of the coagulating agent, and to avoid changing the slight acidity of the impure spirit.

It will be obvious from the foregoing that the process may be used for the treatment of waste alcoholic distillates other than those hereinbefore enumerated, and the examples given should therefore, be considered as illustrative only and not as limiting the scope of the appended claims.

I claim:

1. The process of recovering alcohol normally discarded in the distillation of alcohol containing beverages, comprising, segregating a first distilled fraction and a liquid residue of said beverage distillation, said fractions containing disagreeable flavors, odors, alcohol and colloidal matter, filtering the segregated fractions to remove the colloidal matter, and percolating the resulting filtrate through a layer of a gas-adsorbent activated carbon whereby the disagreeable flavors and odors are removed.

2. The process of recovering alcohol free from foreign odors and tastes from waste, impure fractions of alcohol containing distillates, comprising, filtering the waste distillate through a diatomaceous earth filter, and subsequently percolating the filtrate through a gas-adsorbent activated carbon.

3. The process of recovering alcohol free from foreign odors and tastes from waste, impure fractions of alcohol containing distillates, comprising, clarifying the waste distillate to remove colloidal substances and subsequently percolating the filtrate through a gas-adsorbent activated carbon.

4. In a process of recovering alcohol free from foreign odors and tastes from waste heads and tails fractions of alcohol distillates containing undesirable foreign components, the step of percolating the waste fractions through a layer of a gas-adsorbent activated carbon.

5. The process for recovering alcohol from waste alcohol-containing distillates, comprising, mixing the waste distillate with finely divided activated carbon, separating the carbon from the distillate, and percolating the latter through a layer of granular gas-adsorbent activated carbon.

6. The process for recovering alcohol from waste alcohol-containing distillates, comprising, filtering the waste distillate, mixing the resulting filtrate with finely divided activated carbon, separating the carbon from said filtrate, and percolating the latter through a layer of gas-adsorbent activated carbon.

7. The process of recovering alcohol free from foreign odors and tastes from impure waste fractions separated in alcohol distillation process, comprising, filtering the waste fraction and subsequently percolating the filtrate through a gas-adsorbent acid type activated carbon.

8. The process of recovering alcohol free from foreign odors, tastes and colloidal matter from impure waste heads and tails fractions separated from a gin distillation process, comprising filtering the waste fractions whereby colloidal material is removed and subsequently percolating the filtrate through a layer of gas-adsorbent activated carbon whereby the disagreeable flavors and odors are removed.

9. The process of recovering alcohol from waste fractions normally separated in the distillation of gin, comprising segregating a heads fraction and a residue fraction resulting from said gin distillation, said fractions containing undesirable flavors, odors and colloidal matter, filtering said separated fractions and subsequently percolating the resulting filtrate through a layer of gas-adsorbent activated carbon.

HOWARD G. PETERSON.